(12) United States Patent
Shaylor et al.

(10) Patent No.: US 7,246,347 B1
(45) Date of Patent: Jul. 17, 2007

(54) METHOD AND APPARATUS FOR LOADING CLASS FILES INTO NON-VOLATILE MEMORY

(75) Inventors: Nicholas Shaylor, Sunnyvale, CA (US); Douglas N. Simon, Mountain View, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 825 days.

(21) Appl. No.: 10/603,439

(22) Filed: Jun. 24, 2003

Related U.S. Application Data

(60) Provisional application No. 60/392,375, filed on Jun. 26, 2002, provisional application No. 60/412,607, filed on Sep. 20, 2002.

(51) Int. Cl.
*G06F 9/44* (2006.01)
*G06F 9/46* (2006.01)

(52) U.S. Cl. .................. 717/166; 717/162; 719/332

(58) Field of Classification Search ............... 717/166
See application file for complete search history.

(56) References Cited

U.S. PATENT DOCUMENTS

| | | | |
|---|---|---|---|
| 5,815,718 A * | 9/1998 | Tock | 717/166 |
| 5,999,732 A * | 12/1999 | Bak et al. | 717/148 |
| 6,223,346 B1 * | 4/2001 | Tock | 717/166 |
| 6,253,215 B1 * | 6/2001 | Agesen et al. | 707/206 |
| 6,339,841 B1 * | 1/2002 | Merrick et al. | 717/166 |
| 6,584,612 B1 * | 6/2003 | Mueller et al. | 717/166 |
| 6,779,732 B2 * | 8/2004 | Krishna et al. | 235/492 |
| 6,883,163 B1 * | 4/2005 | Schwabe | 717/126 |
| 6,901,591 B1 * | 5/2005 | Sokolov | 718/1 |
| 6,970,948 B2 * | 11/2005 | Brown et al. | 710/8 |
| 6,983,460 B1 * | 1/2006 | Goire et al. | 717/175 |
| 7,131,121 B2 * | 10/2006 | Krishna et al. | 717/165 |

OTHER PUBLICATIONS

Shaylor, N., Simon, D. N., and Bush, W. R. 2003. A java virtual machine architecture for very small devices. In Proceedings of the 2003 ACM SIGPLAN Conference on Language, Compiler, and Tool For Embedded Systems (San Diego, California, USA, Jun. 11-13, 2003). LCTES '03. ACM Press, New York, NY, 34-41.*

(Continued)

*Primary Examiner*—Tuan Dam
*Assistant Examiner*—J. Derek Rutten
(74) *Attorney, Agent, or Firm*—Park, Vaughan & Fleming, LLP

(57) ABSTRACT

One embodiment of the present invention provides a system that facilitates loading classes into non-volatile memory. During the loading process, the system first loads class definitions into volatile memory, wherein the class definitions contain metadata for classes currently being loaded into non-volatile memory, as well as metadata for classes that are already loaded into non-volatile memory. Next, after the class definitions are loaded into volatile memory, the system loads method code for the classes into non-volatile memory. During this process, the system uses the class definitions to resolve linkages in the method code so that the method code is ready for execution in non-volatile memory.

28 Claims, 4 Drawing Sheets

OTHER PUBLICATIONS

Shaylor, N. 2002. A Just-in-Time Compiler for Memory-Constrained Low-Power Devices. In Proceedings of the 2nd Java™ Virtual Machine Research and Technology Symposium (Aug. 1-2, 2002). S. P. Midkiff, Ed. USENIX Association, Berkeley CA, 119-126.*

Zhiqun Chen and Rinaldo Di Giorgio, Understanding Java Card 2.0, JavaWorld.com, Mar. 1, 1998, accessed and printed Nov. 17, 2006 from <http://www.javaworld.com/javaworld/jw-03-1998/jw-03-javadev.html>, 12 pages.*

Goldberg, A. 1998. A specification of Java loading and bytecode verification. In Proceedings of the 5th ACM Conference on Computer and Communications Security (San Francisco, California, United States, Nov. 2-5, 1998). CCS '98. ACM Press, New York, NY, 49-58.*

Chen, Java Card™ Technology for Smart Cards, Addison Wesley Professional, Jun. 6, 2000, Chapter 3, 20 Pages.*

Leroy, "On-Card Bytecode Verification For Java Card", 2001, Springer Berlin / Heidelberg, Lecture Notes in Computer Science, V. 2140, pp. 150-164.*

Rippert, C., Courbot, A., and Grimaud, G. 2004. A low-footprint class loading mechanism for embedded Java virual machines. In Proceedings of the 3rd International Symposium on Principles and Practice of Programming in Java (Las Vegas, Nevada, Jun. 16-18, 2004). ACM Intl. Conference Proceeding Series, vol. 91. Trinity College Dublin, pp. 75-82.*

Claussen, L. R., Schultz, U. P., Consel, C., and Muller, G. 2000. Java bytecode compression for low-end embedded systems. ACM Trans. Program. Lang. Syst. 22, 3 (May 2000), 471-489.*

Yoon-Sim Yang; Min-Sik Jin; Sung-Ik Jun; Min-Soo Jung, A study on an efficient pre-resolution method for embedded Java system, Virtual Environments, Human-Computer Interfaces and Measurement Systems, 2004. (VECIMS). 2004 IEEE Symposium on, vol., Iss., Jul. 12-14, 2004, pp. 20-24.*

* cited by examiner

METHOD AND APPARATUS FOR LOADING CLASS FILES INTO NON-VOLATILE MEMORY

RELATED APPLICATION

This application hereby claims priority under 35 U.S.C. §119 to U.S. Provisional Patent Application No. 60/392,375, filed on 26 Jun. 2002, entitled "Optimizing Platform Independent Code," by inventors Nicholas Shaylor and Douglas Simon and to U.S. Provisional Patent Application No. 60/412,607, filed on 20 Sep. 2002, entitled "The Squawk System," by inventors Nicholas Shaylor and Douglas Simon.

BACKGROUND

1. Field of the Invention

The present invention relates to the design of platform-independent virtual machines for smaller computing devices. More specifically, the present invention relates to a method and an apparatus for loading class files into non-volatile memory.

2. Related Art

Dramatic advances in computer technology presently make it possible to integrate a significant amount of computing power onto "smart cards." Smart cards are presently used in a variety of applications that solve common security and identity needs. For example, smart cards have been integrated into credit cards, debit cards, corporate badges, and even cell phones.

New smart card designs can accommodate larger amounts of memory. For example, new smart card designs can accommodate up to 160 K bytes of read-only memory (ROM), 64 K bytes of electrically erasable programmable read-only memory (EEPROM), and 8 K bytes of random access memory (RAM). These larger amounts of memory make it possible to integrate more functionality into a smart card.

In particular, the additional memory can be used to implement a virtual machine, such as the JAVA™ virtual machine (JVM), in a smart card, and to allow the use of objects defined within an object-oriented programming system. (JAVA is a trademark of SUN Microsystems, Inc. of Santa Clara, Calif.) Integrating a virtual machine into a smart card enables the smart card to execute a large number of platform-independent applications. Moreover, the associated development environment for the virtual machine can simplify the process of developing applications for smart cards.

While it is possible to implement a virtual machine on one of these smart cards, the memory is still quite limited compared to a typical desktop computer system. This limited memory leads to many challenges in the implementing a virtual machine.

One problem is that there is very little space in RAM for executing platform-independent applications. When a larger computer system receives a platform-independent application, the platform-independent application is typically loaded into RAM before the associated methods are executed. However, because there is an extremely small amount of RAM in a smart card (about 8 K), it is often impossible or impractical to load an entire platform-independent application into RAM prior to execution.

In theory it is possible to execute a platform-independent application in non-volatile memory. However, the platform-independent application must first be translated from its received form, typically a Java ARchive (JAR) file or a Converted APplet (CAP) file, into a representation suitable for execution. During this translation process, a number of operations are performed, such as resolving symbolic references and verifying bytecodes. Unfortunately, existing techniques for performing this translation are not suited for computing devices with small amounts of RAM, such as smart cards.

Hence, what is needed is a method and an apparatus for efficiently loading platform-independent applications into non-volatile memory.

SUMMARY

One embodiment of the present invention provides a system that facilitates loading classes into non-volatile memory. During the loading process, the system first loads class definitions into volatile memory, wherein the class definitions contain metadata for classes currently being loaded into non-volatile memory, as well as metadata for classes that are already loaded into non-volatile memory. Next, after the class definitions are loaded into volatile memory, the system loads method code for the classes into non-volatile memory. During this process, the system uses the class definitions to resolve linkages in the method code so that the method code is ready for execution in non-volatile memory.

In a variation on this embodiment, after the method code is loaded into non-volatile memory, the system uses the class definitions to create class data structures for the classes in non-volatile memory.

In a variation on this embodiment, prior to creating the class data structures in non-volatile memory, the system creates one or more jump tables in non-volatile memory, wherein the jump tables specify the locations of methods.

In a variation on this embodiment, after the class data structures are created in non-volatile memory, the system deletes the class definitions from volatile memory.

In a variation on this embodiment, while resolving linkages in the method code, the system resolves symbolic references into either offset-based references or pointer-based references.

In a variation on this embodiment, the classes are loaded from a suite file, wherein the suite file is organized so that the class definitions for all of the classes in the suite file precede the method code for the classes. This organization facilitates loading the class definitions prior to loading the method code.

In a variation on this embodiment, during the loading of the method code into non-volatile memory, the method code is verified to ensure that the method code is correct with regards to type safety.

In a variation on this embodiment, after the method code is loaded into non-volatile memory, the method code is verified to ensure that branch targets within the method code are valid.

In a variation on this embodiment, the class definitions include: class definitions for classes that are currently being loaded into non-volatile memory (these are referred to as "real classes"); and proxy class definitions for classes that were previously loaded into non-volatile memory.

In a variation on this embodiment, the volatile memory is Random Access Memory (RAM), and the non-volatile memory is Electrically-Erasable Read-Only Memory (EEPROM).

Note that the present invention can also be applied to loading classes into volatile memory, instead of non-volatile memory.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Smart Card

Figure 1:
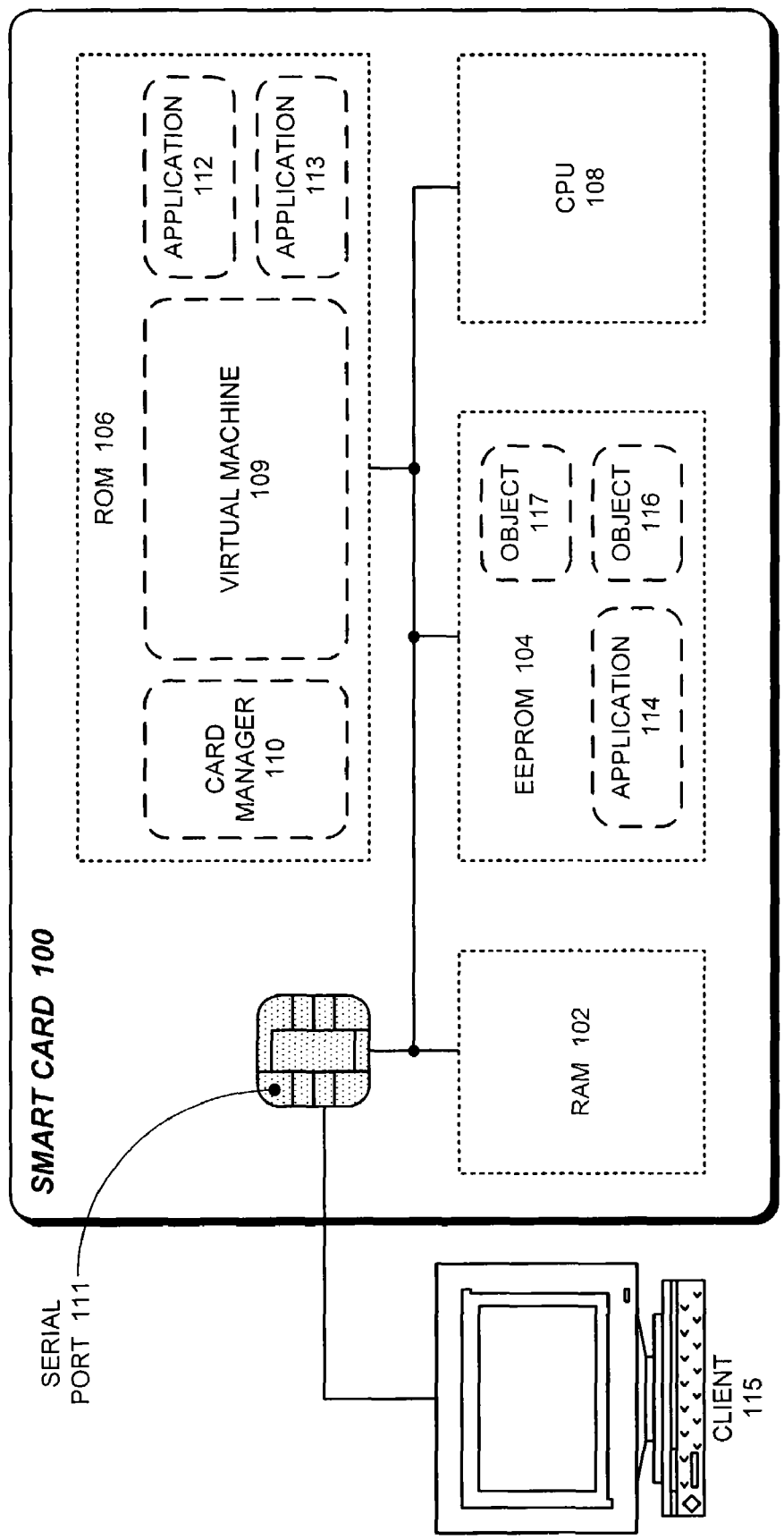
FIG. 1 illustrates a smart card in accordance with an embodiment of the present invention.

FIG. 1 illustrates a smart card in accordance with an embodiment of the present invention. Smart card 100 can generally include any type of miniature computing device, such as may be located within identification cards, client loyalty cards, electronic wallets, data cards, and cellular telephones. However, note that the present invention is not meant to be limited to smart cards, and can generally be applied to any type of computing device or computer system that provides support for code verification and garbage collection in a platform-independent virtual machine.

Smart card 100 contains a central processing unit (CPU) 108, which includes circuitry for performing computational operations. Smart card 100 also contains a number of different types of memory, including random access memory (RAM) 102, electrically erasable programmable read-only memory (EEPROM) 104, and read-only memory (ROM) 106.

In general, RAM 102 can include any type of volatile random access memory; EEPROM 104 can include any type of writeable non-volatile memory, such as EEPROM, flash memory, or magnetic memory; and ROM 106 can include any type of read-only memory.

ROM 106 contains a virtual machine 109, such as the JAVA virtual machine developed by SUN Microsystems, Inc. of Santa Clara, Calif. Note that applications written in a platform-independent programming language, such as the JAVA programming language, can be compiled into corresponding platform-independent bytecodes that can be executed on virtual machine 109.

ROM 106 also contains a number of applications, 112 and 113, which provide services for client 115, which access smart card 100 through serial port 111. Other applications, such as application 114, can be located in EEPROM 104. Yet other applications (not illustrated) may be located in both ROM 106 and EEPROM 104.

ROM 106 also includes a card manager 110, which manages the execution of applications on smart card 100. For example, suppose client 115 wishes to access a service provided by applications 112 on smart card 100. Client 115 first communicates with card manager 110. Card manager 110 then puts client 115 in contact with application 112. This allows client 115 to communicate directly with application 112.

EEPROM 104 also contains a number of objects 116–117, which are accessed by applications 112–114. Note that some objects or portions of objects may be located within RAM 102.

Executing Class Files on a Smart Card Virtual Machine

Figure 2:
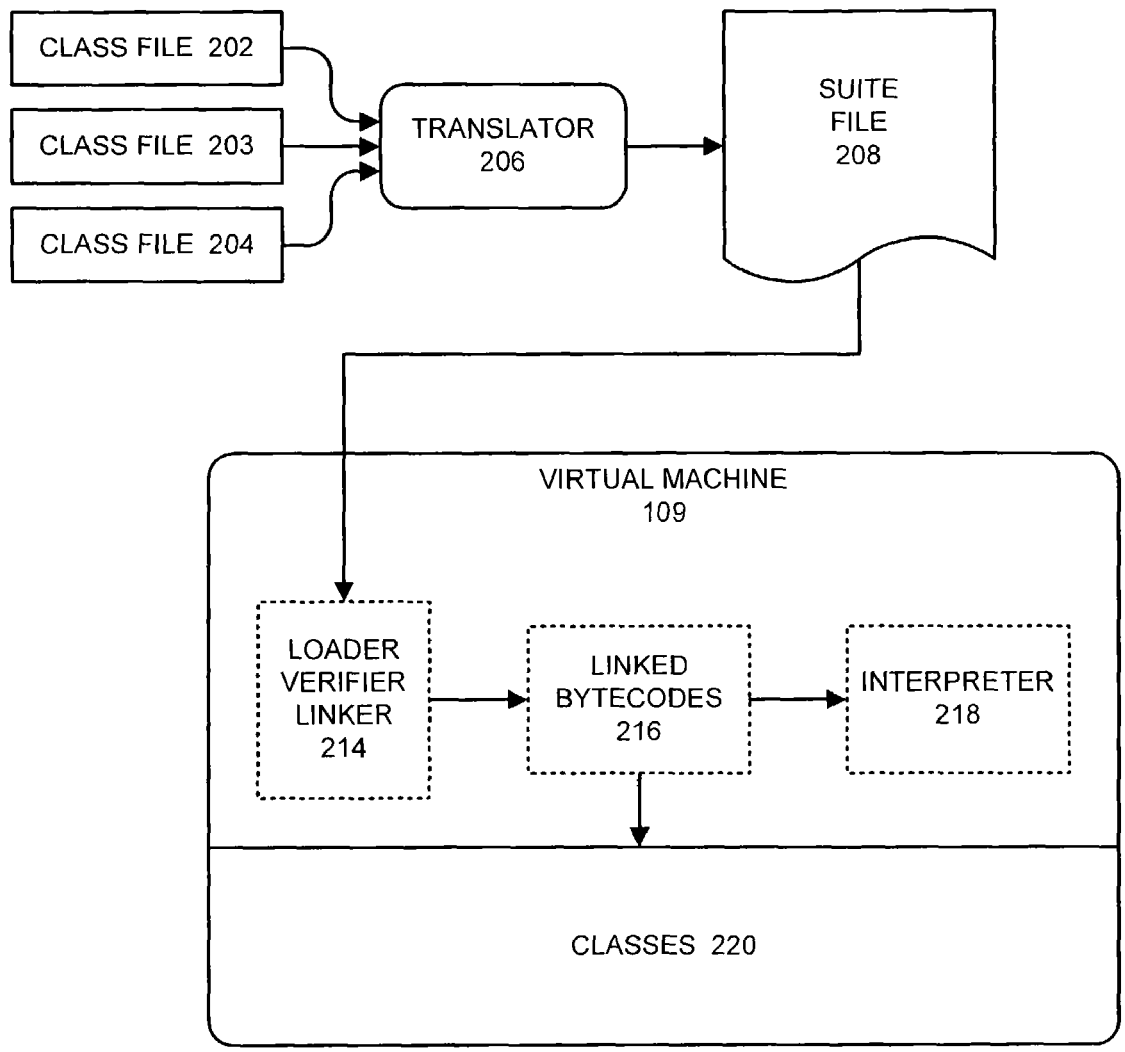
FIG. 2 illustrates how class files are executed on a virtual machine within a smart card in accordance with an embodiment of the present invention.

FIG. 2 illustrates how class files are executed on virtual machine 109 within smart card 100 in accordance with an embodiment of the present invention. In FIG. 2, a number of class files 202–204 (or other types of code modules) are converted by a translator 206 into a suite file 208, which is suitable for execution on virtual machine 109 within smart card 100. Note that this conversion process can take place at a workstation or some other type of computer system that is external to smart card 100.

A number of operations are involved in executing suite file 208 on virtual machine 109. Suite file 208 is first loaded into smart card 100. Next, linker/loader/verifier 214 loads and verifies classes from class files 202–204 and then binds them to library classes 220 within virtual machine 109. This produces linked bytecodes 216. Linked bytecodes 216 are then fed into interpreter 218, which interprets linked bytecodes 216 in order to execute them on virtual machine 109.

During the process of loading suite file 208 into smart card 100, a number of operations take place. These operations are described in more detail below with reference to FIGS. 3–5 below.

Loading Classes into Non-Volatile Memory

Figure 4:
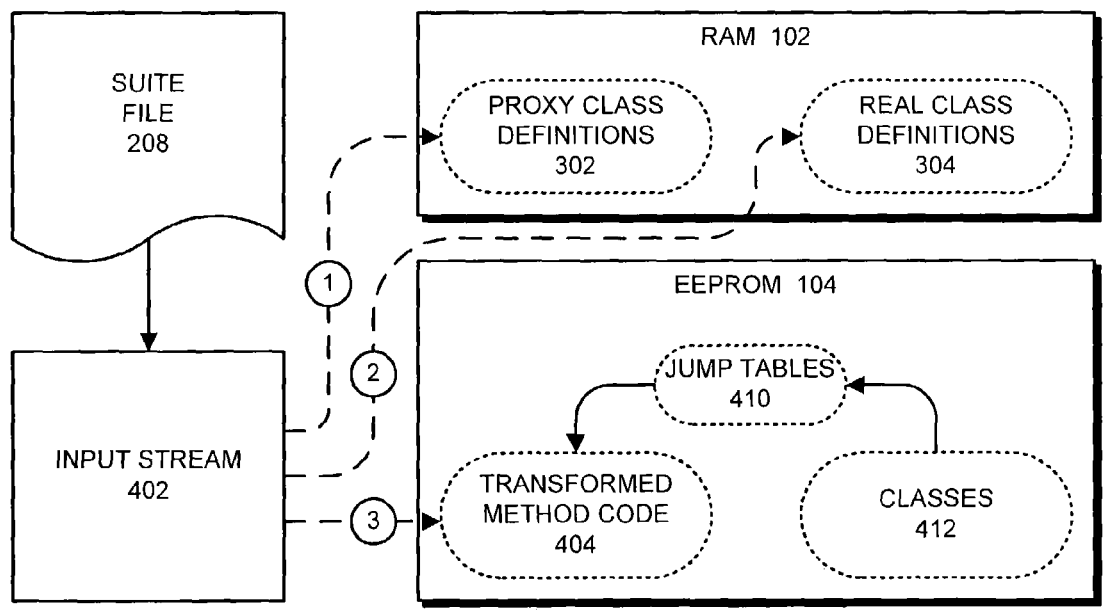
FIG. 4 presents a diagram illustrating how classes are loaded into EEPROM in accordance with an embodiment of the present invention.
Figure 5:
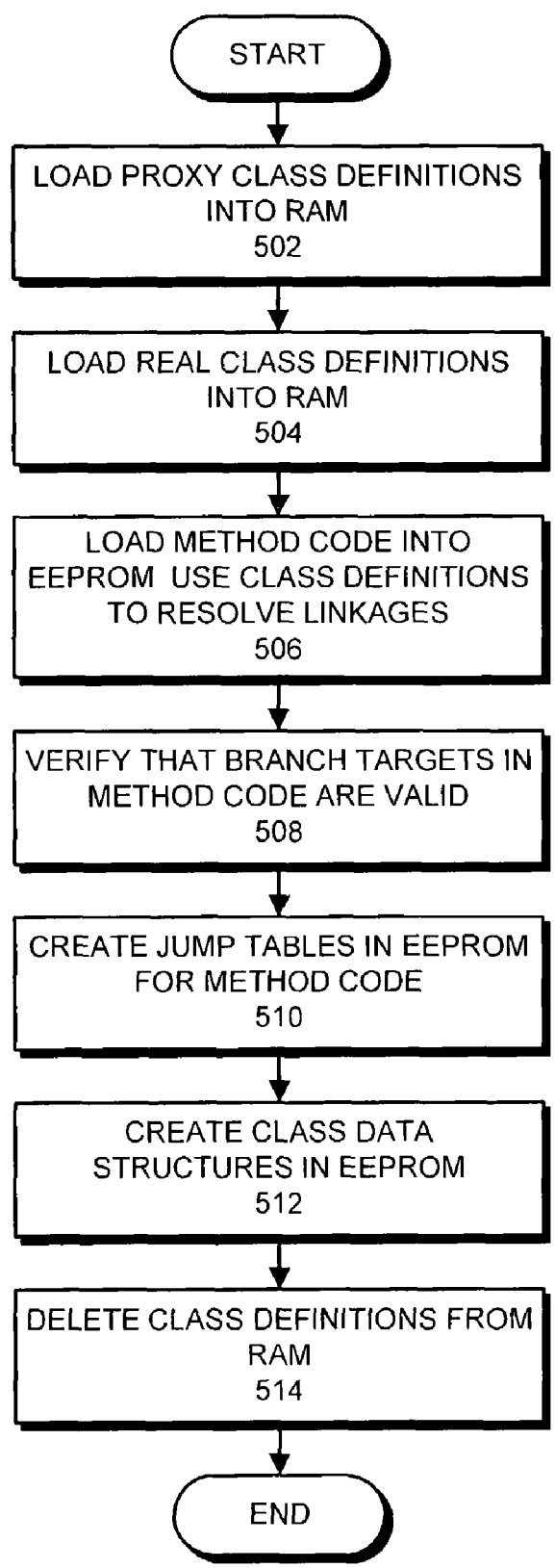
FIG. 5 presents a corresponding flow chart illustrating the process of loading classes into EEPROM in accordance with an embodiment of the present invention.

FIGS. 4 and 5 present a diagram and a corresponding flow chart illustrating how classes are loaded into EEPROM in accordance with an embodiment of the present invention. Suite file 208 is specifically designed so that it can be read serially, with the information in an order that facilitates installation using very little temporary (RAM) memory. The primary difference between suite file 208 and a normal Java container file (such as a JAR file or a CAP file) is that in suite file 208 all the class metadata for all classes precedes any of the methods for those classes. This means that by the time the bytecodes need to be verified all the class definitions have been processed.

Suite file 208 defines a collection of classes, which are referred to as "real classes." Classes external to suite file 208 but used by classes in it are referred to as "proxy classes." Proxy classes contain much of the symbolic information found in the constant pool of a standard classfile, and hence allow the fields and methods of classes external to suite file 208 to be treated in the same way as the real classes defined in suite file 208.

Figure 3:
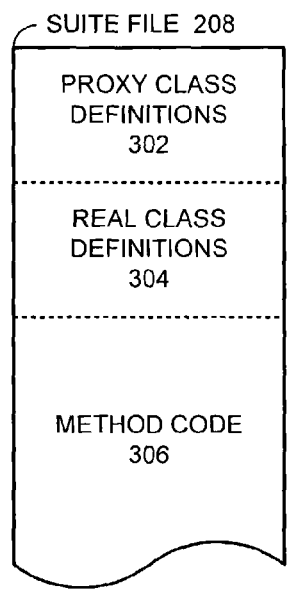
FIG. 3 illustrates a suite file format in accordance with an embodiment of the present invention.

Referring to FIG. 3, suite file 208 is structured so that proxy class definitions 302 come first. Proxy class definitions 302 contain metadata for classes that are already loaded into EEPROM 104. This metadata can include class names and names of class members (methods and fields). Next, come real class definitions 304, which contain metadata for classes that are currently being loaded into EEPROM 104. This metadata can include class names and names of class members, as well as associated attributes and permissions.

After the proxy class definitions and real class definitions comes method code 306 for the classes. Note that the format of suite file 208 differs from conventional JAR file and CAP file formats in that the metadata for all of the classes is separated from the method code. This allows the metadata to be loaded first, which provides certain advantages that are described below with reference to FIGS. 4 and 5.

During the loading process, suite file 208 is serialized into an input stream 402. The first portion of input stream 402 contains proxy class definitions 302, which are loaded into RAM 102 (step 502). The second portion contains real class definitions 304, which are also loaded into RAM 102 (step 504).

Next, proxy class definitions 302 and real class definitions 304 are used to transform method code 306 into transformed method code 404, as method code 306 is being loaded into EEPROM 104 (step 506). This transformation process involves a number of operation, one of which is resolving symbolic references in bytecodes. Note that these symbolic references must be resolved sooner or later through some lookup process. In many Java interpreters this is done as the bytecodes are executed, and a common optimization is to then patch the bytecode stream with special resolved bytecodes, which are referred to as "quick" or "fast" bytecodes, during a process known as "bytecode quickening." This optimization is not suitable for systems that execute bytecodes in read-only or slow-to-write memory. Instead, one embodiment of the present invention resolves bytecodes, as much as possible, when they are loaded into the memory of the target device. At this time, a field access can be resolved to an absolute offset within an object, and a method invocation can be resolved to a offset within a jump table. As a result, there is no need for the symbolic constant pool found in standard Java systems, which can save a great deal of space.

As method code 306 is being loaded, the system reads bytecodes one-by-one from input stream 402, and verifies that they are correct in terms of type safety. The system also resolves class member references as described above, and writes them into their final location in EEPROM 104.

After method code 306 is loaded into EEPROM 104, the system verifies that all branch targets are valid (step 508).

Next, the system builds jump tables 410 in EEPROM 104. These jump tables 410 contain pointers to methods (step 510). The system also creates class data structures (classes 412) in EEPROM 104 using information from real class definitions 304 (step 512). At this point, proxy class definitions 302 and real class definitions in RAM 102 are no longer needed, so they are deleted (step 514).

Note that the above-described process is advantageous because only a few bytes of a given method need be in RAM 102 at one time, and EEPROM 104 can be written serially.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for loading classes into memory, comprising:
  loading class definitions into memory;
  wherein the class definitions are loaded from a serialized suite file defining a collection of classes;
  wherein the class definitions contain real class definitions for classes that are currently being loaded into memory, as well as proxy class definitions for classes that are already loaded into memory; and
  wherein the suite file is organized so that the class definitions for all of the classes in the suite file precede method code corresponding to the real class definitions, thereby facilitating loading the class definitions prior to loading the method code;
  after the class definitions are loaded into memory, loading the method code into memory;
  wherein loading the method code into memory involves transforming the method code, wherein transforming the method code involves using the class definitions to resolve linkages in the method code so that the method code is ready for execution in memory without using a symbolic constant pool.

2. The method of claim 1, wherein the class definitions are loaded into volatile memory and the method code is loaded into non-volatile memory.

3. The method of claim 2, wherein after the method code is loaded into non-volatile memory, the method further comprises using the class definitions to create class data structures for the classes in non-volatile memory.

4. The method of claim 3, wherein prior to creating the class data structures in non-volatile memory, the method further comprises creating one or more jump tables in non-volatile memory, wherein the jump tables specify the locations of methods.

5. The method of claim 3, wherein after the class data structures are created in non-volatile memory, the method further comprises deleting the class definitions from volatile memory.

6. The method of claim 2, wherein resolving linkages in the method code involves quickening the method code by resolving symbolic references into either offset-based references or pointer-based references.

7. The method of claim 2, wherein during the loading of the method code into non-volatile memory, the method code is verified to ensure that the method code is correct with regards to type safety.

8. The method of claim 2, wherein after the method code is loaded into non-volatile memory, the method code is verified to ensure that branch targets within the method code are valid.

9. The method of claim 2,
  wherein the volatile memory is Random Access Memory (RAM); and
  wherein the non-volatile memory is Electrically-Erasable Read-Only Memory (EEPROM).

10. A computer-readable storage medium storing instructions that when executed by a computer cause the computer to perform a method for loading classes into memory, the method comprising:
  loading class definitions into memory;
  wherein the class definitions are loaded from a serialized suite file defining a collection of classes;

wherein the class definitions contain real class definitions for classes that are currently being loaded into memory, as well as proxy class definitions for classes that are already loaded into memory; and wherein the suite file is organized so that the class definitions for all of the classes in the suite file precede method code corresponding to the real class definitions, thereby facilitating loading the class definitions prior to loading the method code;

after the class definitions are loaded into memory, loading the method code into memory;

wherein loading the method code into memory involves transforming the method code, wherein transforming the method code involves using the class definitions to resolve linkages in the method code so that the method code is ready for execution in memory without using a symbolic constant pool.

11. The computer-readable storage medium of claim 10, wherein the class definitions are loaded into volatile memory and the method code is loaded into non-volatile memory.

12. The computer-readable storage medium of claim 11, wherein after the method code is loaded into non-volatile memory, the method further comprises using the class definitions to create class data structures for the classes in non-volatile memory.

13. The computer-readable storage medium of claim 12, wherein prior to creating the class data structures in non-volatile memory, the method further comprises creating one or more jump tables in non-volatile memory, wherein the jump tables specify the locations of methods.

14. The computer-readable storage medium of claim 12, wherein after the class data structures are created in non-volatile memory, the method further comprises deleting the class definitions from volatile memory.

15. The computer-readable storage medium of claim 11, wherein resolving linkages in the method code involves quickening the method code by resolving symbolic references into either offset-based references or pointer-based references.

16. The computer-readable storage medium of claim 11, wherein during the loading of the method code into non-volatile memory, the method code is verified to ensure that the method code is correct with regards to type safety.

17. The computer-readable storage medium of claim 11, wherein after the method code is loaded into non-volatile memory, the method code is verified to ensure that branch targets within the method code are valid.

18. The computer-readable storage medium of claim 11, wherein the volatile memory is Random Access Memory (RAM); and
wherein the non-volatile memory is Electrically-Erasable Read-Only Memory (EEPROM).

19. An apparatus that loads classes into memory, comprising:
a loading mechanism;
wherein the loading mechanism is configure to load class definitions into memory;
wherein the class definitions are loaded from a serialized suite file defining a collection of classes;
wherein the class definitions contain real class definitions for classes that are currently being loaded into memory, as well as proxy class definitions for classes that are already loaded into memory; and
wherein the suite file is organized so that the class definitions for all of the classes in the suite file precede method code corresponding to the real class definitions, thereby facilitating loading the class definitions prior to loading the method code;
wherein after the class definitions are loaded into memory, the loading mechanism is configured to load the method code into memory;
wherein loading the method code into memory involves transforming the method code, wherein transforming the method-code involves using the class definitions to resolve linkages in the method code so that the method code is ready for execution in memory without using a symbolic constant pool.

20. The apparatus of claim 19, wherein the class definitions are loaded into volatile memory and the method code is loaded into non-volatile memory.

21. The apparatus of claim 20, wherein after the method code is loaded into non-volatile memory, the loading mechanism is configured to use the class definitions to create class data structures for the classes in non-volatile memory.

22. The apparatus of claim 21, wherein prior to creating the class data structures in non-volatile memory, the loading mechanism is configured to create one or more jump tables in non-volatile memory, wherein the jump tables specify the locations of methods.

23. The apparatus of claim 21, wherein after the class data structures are created in non-volatile memory the loading mechanism is configured to delete the class definitions from volatile memory.

24. The apparatus of claim 20, wherein the loading mechanism is configured to resolve linkages in the method code by quickening the method code to resolve symbolic references into either offset-based references or pointer-based references.

25. The apparatus of claim 20, wherein during loading of the method code into non-volatile memory, the loading mechanism is configured to verify the method code to ensure that the method code is correct with regards to type safety.

26. The apparatus of claim 20, wherein after the method code is loaded into non-volatile memory, the loading mechanism is configured to verify that branch targets within the method code are valid.

27. The apparatus of claim 20,
wherein the volatile memory is Random Access Memory (RAM); and
wherein the non-volatile memory is Electrically-Erasable Read-Only Memory (EEPROM).

28. A computing device configured to load classes into non-volatile memory, comprising:
a computing engine;
a volatile memory;
a non-volatile memory;
a loading mechanism;
wherein the loading mechanism is configure to load class definitions into the volatile memory;
wherein the class definitions are loaded from a serialized suite file defining a collection of classes;
wherein the class definitions contain real class definitions for classes that are currently being loaded into non-volatile memory, as well as proxy class definitions for classes that are already loaded into non-volatile memory; and
wherein the suite file is organized so that the class definitions for all of the classes in the suite file precede method code corresponding to the real class definitions, thereby facilitating loading the class definitions prior to loading the method code;

wherein after the class definitions are loaded into volatile memory, the loading mechanism is configured to load the method code into the non-volatile memory;

wherein loading the method code into the non-volatile memory involves transforming the method code, wherein transforming the method code involves using the class definitions to resolve linkages in the method code so that the method code is ready for execution in the non-volatile memory without using a symbolic constant pool.

* * * * *